Nov. 14, 1944. C. W. MOTT 2,362,713
PRESSURE REGULATING APPARATUS FOR CONSTANT DELIVERY PUMPS
Filed Dec. 31, 1943
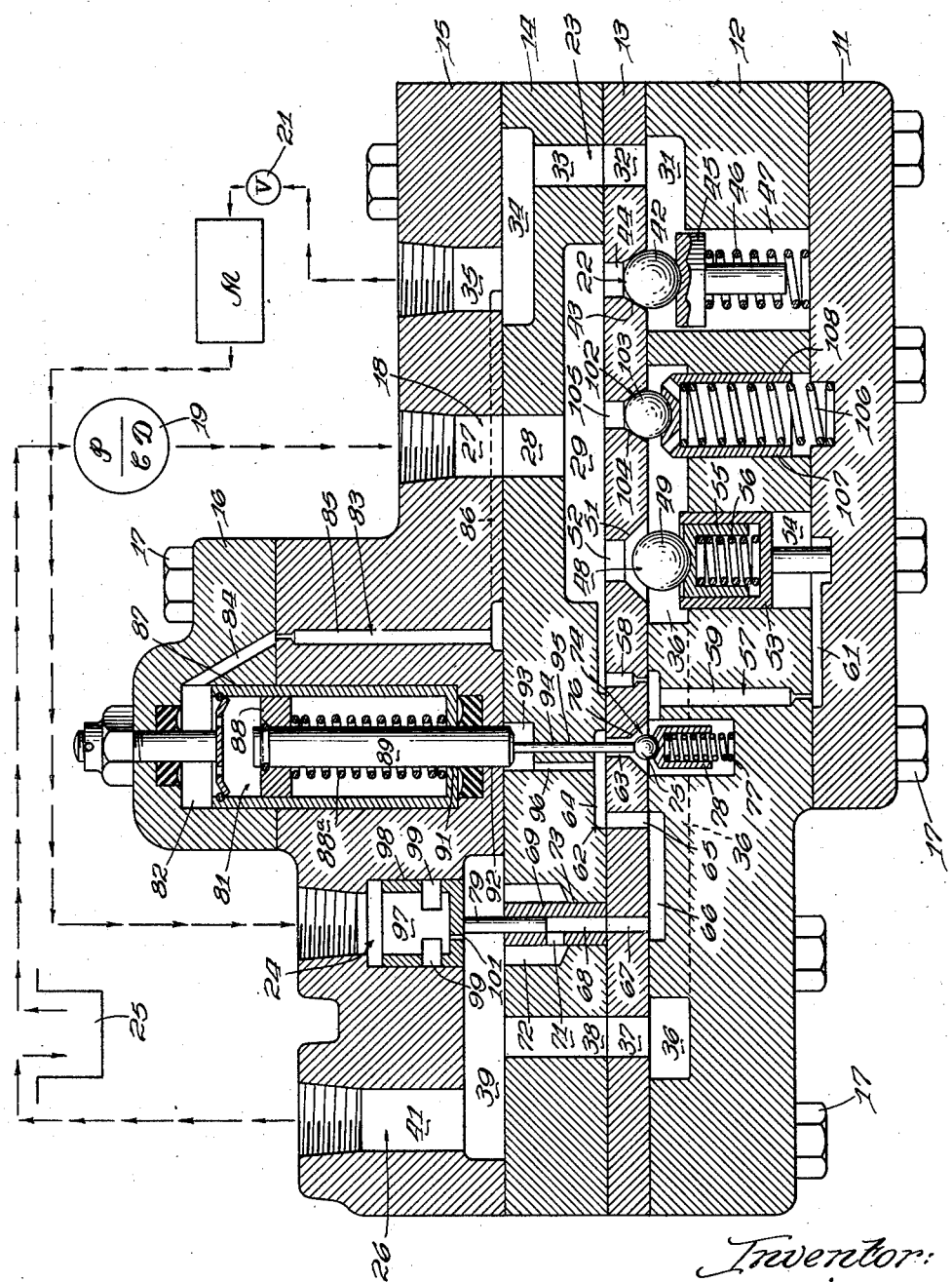
Inventor:
Earl W. Mott.
By Paul O. Pippel
Atty.

Patented Nov. 14, 1944

2,362,713

UNITED STATES PATENT OFFICE 2,362,713

PRESSURE REGULATING APPARATUS FOR CONSTANT DELIVERY PUMPS

Carl W. Mott, La Grange, Ill., assignor to International Harvester Company, a corporation of New Jersey Application December 31, 1943, Serial No. 516,469

11 Claims. (Cl. 60—52)

This invention has to do with a pressure regulating apparatus of a character employable in a circuit including a constant delivery pump and a motor driveable by motor propelling fluid discharged from the pump. The invention relates more particularly to a type of pressure regulating apparatus which is operable to by-pass the pumped fluid at low pressure, excepting when delivery of fluid is made into the motor, and in which apparatus there is included a control which prevents creation of the by-pass condition so long as the motor is operating.

Heretofore, pressure regulating apparatus has been employed for by-passing the output of a constantly driven pump at low pressure and has been operable responsively to a pressure drop in a fluid delivery passage of the apparatus, through which fluid is delivered to the motor, to close a by-pass valve in the apparatus so that the by-pass condition thereof is terminated and the fluid is directed to the motor at high pressure, and in such apparatus the means for controlling the by-pass valve has been also operable to open the by-pass valve upon the occurrence of a predeterminedly high pressure in the delivery passage to the motor. Because of the entire output of the pump being directed to the motor through the delivery passage of the pressure regulating apparatus, and because of the relative non-compressibility of the fluid (usually oil) and the relative non-expansible character of the fluid delivery passage, said predetermined pressure increase occurs very quickly when the motor is allowed to operate at slow speed. Likewise, because of the aforesaid character of the fluid and of the fluid delivery passage, the pressure of predetermined maximum amount upon being attained, and the by-pass condition established, is very quickly dissipated so that the effect, when the motor is operated slowly, has been for a rapid succession of by-pass and non-by-pass conditions of the apparatus occurring at an audible frequency, setting up a chattering noise in the apparatus.

The primary object of the present invention is the provision of an auxiliary control means for the by-pass valve of such apparatus for precluding the opening of such valve irrespective of the magnitude of the pressure attained in the fluid delivery passage when the motor is operated.

A more specific object of the invention is the utilization of a control value means having counterparts either of which is operable to cause the by-pass valve to remain in the closed position, and the further utilization of a control means having counterparts for respectively operating the control valve means counterparts, whereby one of the valve counterparts is controlled to cause closing of the by-pass valve in response to a drop in pressure in the fluid delivery passage of the apparatus and whereby the other valve counterpart is controlled to cause the by-pass valve to remain closed so long as the motor is operating.

A further object of the invention is the provision of means subjected to the discharge of fluid expended from the motor for operating the valve counterpart which is controlled by the operation of the motor.

These and other desirable objects inherent in and encompassed by the invention will become more readily apparent from the ensuing description when read in conjunction with the single figure of drawing annexed hereto and which shows in section an apparatus embodying a preferred form of the invention, together with diagrammatic symbols illustrating the connections therewith of a constant delivery pump, a fluid driven motor, a valve controlling the admittance of fluid to the motor, and a reservoir.

With continued reference to the drawing, the casing for the apparatus can be seen to consist of a laminated structure including a group of superposed plates designated 11 to 16. These plates are suitably apertured for the reception of bolts as 17 for holding the plates in assembly. Fluid is delivered to an inlet channel 18 on the apparatus from a constant delivery pump 19, and when an admittance valve 21 is opened, the fluid entering the channel 18 can flow past a check valve 22 into a delivery channel 23 and thence through said valve 21 to the motor M. Pursuant to operation of the motor M, fluid is discharged or expended from an exhaust portion thereof into a fluid return passage 24 of the apparatus. Fluid for the pump 19 is obtained from a reservoir 25 and the fluid is replenished to the reservoir 25 from a by-pass passage 26 in the apparatus.

Various passages and channels are formed in the casing by means of holes through certain of the plates and open channels in opposed faces of the plates which when placed in abutting relation convert these channels into buried channels. The receiving passage 18, for example, includes holes 27 and 28 in the plates 15 and 14, and a channel 29 in the underface of the plate 14. The delivery passage includes a channel 31 in the upper face of plate 12, holes 32 and 33 in the plates 13 and 14, channel 34 in plate 14, and a hole 35 in the plate 15. The by-pass passage includes a channel 36 in the upper face of the plate 12, holes 37 and 38 in the plates 13 and 14, a channel 39 in the plate 15, and a hole 41 in said plate 15.

The aforesaid check valve 22 includes a ball 42 urged onto a seat 43 therefor formed within a hole 44 in the plate 13. Seating means for the ball 42 includes a headed follower member 45 and a spring 46, both disposed within a hole 47 in the plate 12. A by-pass valve 48, for controlling communication between the inlet passage 18 and the by-pass passage 26, includes a ball 49 forcibly pressibly onto a seat 51 therefor, formed within a hole 52 in the plate 13. Fluid actuated means for forcibly pressing the ball 49 onto the seat 51 includes a cup-like piston 53 slidable within a cylinder bore 54 formed as a hole in the plate 12. A spring cup 55 serving as a follower for the ball 49 is slidable within the piston 53 where said spring cup is inverted over a spring 56. Fluid pressure incurred in the cylinder bore 54, beneath the piston 53, raises the same together with the spring and follower therein for seating the ball 49. A pressure transfer passage 57, for supplying the fluid pressure beneath the piston 53, is obtained in a manner presently described from the inlet passage 18 and includes a limited flow capacity hole 58 in the plate 13, a limited flow capacity hole 59, and a channel 61 in the plate 11.

Excepting when fluid is allowed to escape from the pressure transfer passage 57, said passage will cause an equalization of pressure in the hole 52 above the by-pass ball 59 and in the space in the bore 54, beneath the piston 53, and since the area of the lower end of the piston 53 exceeds the transverse area of the hole 52, the composite force exerted upwardly on the piston will exceed that exerted downwardly on the ball 49 with the result that said ball will be held positively seated irrespective of the magnitude of pressure occurring in the inlet passage 18.

A control passage for diverting fluid from the pressure transfer passage 57 is designated 62. This control passage includes a hole 63 in the plate 13, a channel 64 in the plate 14, a second hole, 65, in the plate 13, a channel 66 in the plate 12, a third hole, 67, in the plate 13, an axial bore 68 in a sleeve 69, a valve port 71, and a countersunk portion 72 of a hole 73, in which said sleeve 69 is disposed. Control valve means consisting of two counterparts are employed for controlling the escape of fluid from the transfer passage 57, through the control passage 62, into the by-pass passage 26. One of these control valve counterparts is designated 74 and includes a ball 75 urged onto a seat 76 therefor formed in the hole 63 by means of a spring 77 acting upon a ball follower 78. When the ball 75 is upon the seat 76, the hole 63 will be closed, preventing the escape of fluid from the pressure transfer passage 57. The other control valve counterpart includes the aforesaid sleeve 69 and a plunger 79 slidable axially therein into and from closing relation with the port 71 in said sleeve. When the plunger 79 is lowered from the position shown in the drawing, into closing relation with the port 71, this control valve counterpart 69—79 will be effective for preventing the escape of fluid from the pressure transfer passage 57, just as effectively as the control valve means counterpart 74, though the said control valve means counterpart 74 should be opened.

The control valve means counterpart 74 is operated by a valve control means which functions in accordance with the pressure in the fluid delivery passage 23. Said valve control means is generally designated 81. This control means 81 includes chamber 82 formed within casing plates 15 and 16. The upper end of this chamber 82 communicates with the fluid delivery passage 23 through a passage 83, consisting of channels 84, 85, and 86 in the plates 16 and 15. A cylindrical cup 87 within the chamber 82 contains a piston 88 connected with a stem 89, extending downwardly through a hole 91 in the bottom of the cup 87 and through a hole 92 in the plate 15, into a recess 93 in the plate 14. The lower end of the stem has a reduced diameter portion 94 which projects through a hole 95 in the plate 14 into hole 63 of plate 13 for forcing the valve ball 75 downwardly into the unseated position shown when the piston 88 and the stem 89 are lowered by the existence of a sufficient fluid pressure in the chamber 82 above the piston 88. When the valve member 79 is in the elevated position (shown) for uncovering the port 71, fluid can enter the recess 93 at the lower end of the large diameter portion of the stem 89 and can be exhausted therefrom freely through a breather hole 96.

Control means for the control valve means counterpart 69—79 takes the form of a cup-like piston member 97 contained slidably within a cylindrical portion 98 of the return passage 24 formed in the plate 15. This piston member 97 has diametrically opposed circumferentially extending sidewall openings 99 and a small breather opening 101 in its bottom. The entire exhaust output of the motor M is discharged into the return passage 24 so that, while the motor is operating even at minimum speed, there will be sufficient discharge of fluid into the return passage 24 for forcing the piston 97 downwardly sufficiently far to place the stem 79 in covering relation with the port 71 to insure that no fluid shall escape from the pressure transfer passage 57. Substantially concurrently with the piston 79 moving downwardly far enough to place the stem 79 over the port 71, said sidewall openings 99 of the piston will be projected into communication with the by-pass passage 26. Said sidewall openings 99, when projected entirely into the by-pass passage, have a combined flow capacity adequate to conduct the fluid discharge from the motor M without materially impeding its operating speed.

Assurance that undesirably high pressures shall be avoided in the apparatus is provided for by a pressure relief valve 102 which consists of a ball 103, urged against a seat 104 in an opening 105 of the plate 13 by a spring 106, which acts upwardly upon a spring cup follower 107 which is slidable within a hole 108 in the plate 12.

Operation of the apparatus

The apparatus is shown in the drawing with its parts in their respective positions for establishing the by-pass condition. Such by-pass condition is incurred by fluid at high pressure trapped in the fluid delivery passage 23, between the admittance valve 21 for the motor M and the check valve 22. Upon the stopping of the motor M, the admittance valve 21 is closed and the fluid delivery into the inlet passage 18, from the constant delivery pump 19, continues to flow past the check valve 22 until the fluid pressure in the delivery passage 23 attains such a predetermined maximum that it is effective through the fluid column in the control passage 83 to develop sufficient fluid pressure in the chamber 82 for pressing the piston 88 downwardly against the force of the spring 88a for opening the control valve 74. Concurrently with the closing of the valve 21 and the stopping of the motor M, the fluid ceases to be discharged from the motor into the return passage 24, whereby fluid in the sleeve 69 beneath the valve stem 79 presses this stem and the cup-like piston 97 upwardly, while discharging the fluid from this piston through the breather opening 101. The two control valve counterparts 74 and 69—79 being thus opened, fluid is free to escape from the pressure transfer passage 57, through the control passage 62, past the valve 74 and the valve 69—79, through the port 71 and into the by-pass passage 26 from which it is discharged into the reservoir 25. This escape of fluid, through the control passage 62 from the discharge pressure transfer passage 57, incurs a unit pressure beneath the by-pass valve closing piston 53 less than the pressure in the inlet passage 29 above the by-pass valve ball 49. This pressure differential is caused to obtain, because the flow capacity of the control passage 62 exceeds the flow capacity of the small bore or hole 58 in the pressure transfer passage 57. Consequently, the predominating pressure above the ball 49 opens the by-pass valve 48 and permits the fluid to escape from the inlet passage 18 into the by-pass passage 26, so that the fluid from the constant delivery motor can be circulated freely at low pressure.

When it is desired to cause the motor M to be driven, the apparatus will function automatically, upon the opening of the admittance valve 21, to terminate the by-pass condition and deliver fluid at high pressure into the delivery passage 23 for actuating the motor. Opening of the admittance valve 21, and the ensuing initial movement of the work member of the motor M, will instantaneously cause a slight reduction of the pressure in the delivery passage 23, and this pressure reduction by virtue of the communicative passage 83 with the control means chamber 82 causes a corresponding pressure diminution in such chamber, permitting the piston 88 to be elevated by the spring 88a for closing the control valve 74, thus the control passage 62 is blocked so that the pressure transfer passage 57 conducts fluid from the inlet passage 18 to the bore 54, beneath the by-pass valve operating piston 53, for raising this piston to close the by-pass valve 48.

Now with the by-pass valve closed, the entire output of the pump 19 must escape from the inlet passage 18, past the check valve 22 to motor M, providing the admittance valve 21 is opened sufficiently far to pass the entire pump output, or through the pressure relief valve 102 into the by-pass passage 106. The spring 106 of the pressure relief valve 102 is sufficiently strong to prevent opening of this valve, excepting under abnormally high pressure in the receiving chamber 18. Therefore, before the pressure relief valve 102 opens, assuming the admittance valve 21 to be but partially opened to cause the motor to be driven at slow speed, a predetermined maximum pressure will be attained in the delivery passage 23 and transmitted through the passage 83 for forcing the piston 88 downwardly to open the control valve 74. Assuming for the moment that the control valve counterpart 69—79 were not present, this opening of the valve 74 would clear the control passage 62 for bleeding fluid from the pressure transfer passage 57 for opening the by-pass valve 48. Delivery from the receiving passage 18 into the delivery passage 23 would immediately cease, but since the valve 21 would remain open for delivering fluid to the motor M, which is moving at the slow speed, and because of the relative noncompressibility of the fluid in said delivery passage and the relative nonexpansible character of the walls of this delivery passage, the slow delivery of fluid through the admittance valve 21 would be effective for instantaneously lowering the pressure in the delivery passage 23 and, hence, in the chamber 82 for permitting the piston 88 to rise, and close the control valve 74 for again establishing the closed condition of the by-pass valve 48 for terminating the by-pass condition of the apparatus. Thus, while the admittance valve 21 would be but partially opened to take but part of the output of the constant delivery pump 19 when it is desired to operate the motor M at a slow speed, an operating condition would prevail in which the control valve counterpart 74 and the by-pass valve 48 would be rapidly opened and closed. This rapid opening and closing of the valve 74 and 48 is undesirable because of undue wear of their balls and ball seats, and also because of a chattering noise thereby incurred.

The aforesaid vacillations of the valves 74 and 48 is prevented by the important improvement constituted by the cooperating pressure relief valve 102 and the control valve counterpart 69—79. During operation of the motor M at any speed, fluid is expended from its exhaust into the return port 24, whereby the cup-like piston member 97 together with the valve stem 79 is forced downwardly causing said valve stem to close the port 71 in the control passage 62. Piston member 97 moves downwardly far enough for opposed openings 99 in the sidewalls to register with the channel 39 which is a constituent of the by-pass passage 26, whereby the motor exhaust is directed into the by-pass passage for ultimate discharge into the reservoir 25. With the port 71 closed by the valve stem 79 and upon the pressure in the delivery passage 23 attaining the aforesaid maximum for forcing the piston 88 downwardly for opening the control valve counterpart 74, the by-pass valve 48 will be unaffected, since the control passage 62 will remain blocked to prevent the escape of fluid from beneath the actuating means piston 53 for the by-pass valve. Slow operation of the motor M by a partial opening of the admittance valve 21 will thus be caused to incur a somewhat abnormal high pressure in the passages 18 and 23, but the pressure relief valve 102 is adjusted for opening prior to the attainment of dangerously high pressure in these passages, and thereby allowing the fluid to escape through the hole 105 into the by-pass passage 26.

It will be seen, therefore, that during the periods when the motor M is operated at slow speeds, the excess delivery of the constant delivery pump is by-passed through the pressure relief valve 102 at high pressure, but this is unobjectionable since such operating periods for the apparatus will be comparatively infrequent and of short duration.

Upon the closing of the admittance valve 21 for stopping the motor M, the pressure in the delivery passage 23 will immediately rise sufficiently for moving the piston 88 downwardly for opening the control valve counterpart 74, if such pressure had not already been at this magnitude. Discharge from the pump will then occur or continue past the pressure relief valve 102 into the by-pass passage 26, and the pressure of fluid in the inlet passage 18 will be transmitted through the small bore or hole 58 in the pressure transfer passage 57, past the control valve counterpart 74 and into the control passage 62 for urging the valve stem 79 and the piston 97 upwardly. With the motor stopped and fluid no longer being discharged into the return passage 24, the upward force of the fluid upon the lower end of the valve stem 79 will cause the piston 97 to rise on expelling fluid from the breather hole 101, and when the valve stem 79, and piston 97 having been raised sufficiently to uncover the port 71, fluid can escape from the pressure transfer passage 67 through the control passage 62 for causing the by-pass valve 48 to open and reestablish the by-pass condition of the apparatus.

It was explained above how the control valve counterpart 69—79 when closing the port 71 is thereby effective for preventing escape from the pressure transfer passage 67 and for thereby preventing establishment of the by-pass condition of the apparatus even though the control valve counterpart 74 should be opened. It should be noted, however, that with a sufficiently strong spring 88a in the control means for said control valve counterpart 74 and with the lower end of the large diameter portion of the valve stem 89 in the recesses 93 of sufficiently large area with respect to the upper-end face of the piston 88, the fluid retained within the control passage 62 (and in the recess 93 and the breather hole 96) between the valve 69—79 and the spring pressed ball 75 of the valve 74, will be effective for preventing downward displacement of the valve stem 89, so long as the valve 69—79 is closed.

Having thus described the invention, I claim:

1. In a pressure regulating apparatus employable in a circulating system including a constant delivery pump and a fluid-driven motor drivable by fluid discharged from said pump; a fluid inlet passage for connection with the pump discharge, a fluid delivery passage for connection with the motor inlet, a check valve separating said fluid delivery passage from said inlet passage, a by-pass passage, a by-pass valve separating said inlet passage from the by-pass passage and operable, when closed, to incur sufficient build-up of pressure in the inlet passage for opening the check valve and discharging to the motor through said delivery passage, by-pass valve closing means capable of disablement to cause the by-pass valve to open, disabling means responsive to a predetermined increase of pressure in said delivery passage for disabling the by-pass valve closing means, means responsive to fluid discharge from the motor to contravene the disabling function of said disabling means, and a pressure relief valve disposed to relieve fluid from said inlet passage in the prevention of excessive pressure therein.

2. In a pressure regulating apparatus employable in a circulatory system between a constant delivery pump and a fluid-driven motor drivable by fluid discharged from said pump; a delivery passage communicative with said motor to conduct propelling fluid thereto from the pump at high pressure, a by-pass passage communicative with said delivery passage to by-pass the fluid therefrom about the motor at low pressure, a by-pass valve openable to create said communication of the by-pass passage and closable to terminate the same, means operable responsively to a decrease in the pressure in said delivery passage to close said by-pass valve, and means responsive to the prevailing operation of said motor to preclude the opening of said by-pass valve.

3. In a pressure regulating apparatus for the propelling fluid of a fluid-driven motor; a delivery passage through which fluid is delivered to the motor, a by-pass passage, a by-pass valve operable to introduce the fluid into the by-pass passage divertively of said delivery passage and closable to preclude such introduction of fluid into the by-pass passage, valve closing means subjectable to the pressure of said fluid for actuation to close said by-pass valve, control valve means operable responsively to a predetermined decrease of pressure in said delivery passage to subject the valve closing means to the pressure of said fluid as aforesaid for actuating the same, and means responsive to the operation of said motor to preclude the opening of said by-pass valve while the motor is being driven.

4. In a pressure regulating apparatus for the propelling fluid of a fluid-driven motor; a delivery passage through which fluid is delivered to the motor excepting when diverted from said delivery passage, a by-pass passage, a by-pass valve operable to introduce the fluid into said by-pass passage divertively of said delivery passage and closable to preclude such introduction of the fluid into said by-pass passage, valve closing means actuable to close the by-pass valve, control means operable responsively to a decrease of pressure in said delivery passage to incur the actuation of said valve closing means, and means responsive to the operation of said motor to preclude opening of the by-pass valve while the motor is being driven.

5. The combination set forth in claim 4, wherein said means responsive to the operation of the motor serves to maintain the valve closing means actuated during operation of the motor.

6. In a pressure regulating apparatus for the propelling fluid of a fluid-driven motor having an exhaust through which fluid is expended during its operation; a delivery passage through which fluid is delivered to the motor, a by-pass passage, a by-pass valve operable to introduce the fluid into the by-pass passage divertively of said delivery passage and closable to preclude such introduction of fluid into the by-pass passage, valve closing means subjectable to the pressure of said fluid for actuation to close said by-pass valve, control valve means operable responsively to a predetermined decrease of pressure in said delivery passage to subject the valve closing means to the pressure of said fluid as aforesaid for actuating the same, and means operable by the expended fluid to maintain said valve closing means subjected to the fluid pressure for actuating the same.

7. In a pressure regulating apparatus for the propelling fluid of a fluid-driven motor having an exhaust through which fluid is expended during its operation; a receiving passage for the reception of such fluid, a delivery passage through which the fluid is delivered from said receiving passage to the motor, a return passage for the fluid expended from the motor, a by-pass passage, a by-pass valve operable to direct the receiving passage fluid into the by-pass passage divertively of the delivery passage and closable to direct the receiving passage fluid into the delivery passage, valve operating means for said by-pass valve, control means operable responsively to a decrease of pressure in said delivery passage to cause said operating means to close said by-pass valve, and means operable by the expending of fluid into said return passage for precluding opening of the by-pass valve.

8. The combination set forth in claim 7, wherein said means responsive to the expending of fluid into the return passage controls said valve operating means to maintain the by-pass valve closed during such expending of fluid.

9. In a pressure regulating apparatus for the propelling fluid of a fluid-driven motor having an exhaust through which fluid is expended during its operation; a receiving passage for the reception of such fluid, a delivery passage through which the fluid is delivered from said receiving passage to the motor, a return passage for the fluid expended from the motor, a by-pass passage, a by-pass valve operable to direct the receiving passage fluid into the by-pass passage divertively of the delivery passage and closable to direct the receiving passage fluid into the delivery passage, valve operating means for said by-pass valve, said valve operating means being operable to close the by-pass valve when subjected to the pressure of the fluid in said receiving passage, control valve means operable to subject said valve operating means to said receiving passage pressure, and control means operable responsively to a decrease of pressure in said delivery passage for so operating the control valve means and operable responsively to the expending of fluid into said return passage for maintaining the control valve means in an operated condition so long as fluid is expended into the return passage irrespective of subsequent fluctuations in the delivery passage pressure.

10. In a pressure regulating apparatus for the propelling fluid of a fluid-driven motor having an exhaust through which fluid is expended during its operation; a receiving passage for the reception of such fluid, a delivery passage through which the fluid is delivered from said receiving passage to the motor, a return passage for the fluid expended from the motor, a by-pass passage, a by-pass valve operable to direct the receiving passage fluid into the by-pass passage divertively of the delivery passage and closable to direct the receiving passage fluid into the delivery passage, valve operating means for said by-pass valve, said valve operating means being operable to close the by-pass valve when subjected to the pressure of the fluid in said receiving passage, control valve means including counterparts of which either is operable to subject said valve operating means to the receiving passage pressure, and control means comprising counterparts of which one is operable responsively to a decrease of pressure in the delivery passage for so operating one of the control valve counterparts and of which control means counterparts the other is operable responsively to the expending of fluid into the return passage for so operating the other of the control valve counterparts.

11. In a pressure regulating apparatus employable in a system utilizing a constant delivery pump for causing periodic movement of a fluid column; a fluid inlet passage for connection with the pump discharge, a fluid delivery passage for the issuance of said fluid column, a check valve separating said fluid delivery passage from said inlet passage, a by-pass passage, a by-pass valve separating said inlet passage from the by-pass passage and operable, when closed, to incur sufficient build-up of pressure in the inlet passage for opening the check valve and discharging through said delivery passage to move said column, by-pass valve closing means capable of disablement to cause the by-pass valve to open, disabling means responsive to a predetermined increase of pressure in said delivery passage for disabling the by-pass valve closing means, means responsive to the movement of said fluid column to contravene the disabling function of said disabling means, and a pressure relief valve disposed to relieve fluid from said inlet passage in the prevention of excessive pressure therein.

CARL W. MOTT.